(12) United States Patent  
Arunkumar et al.

(10) Patent No.: US 9,319,876 B2  
(45) Date of Patent: Apr. 19, 2016

(54) ANONYMIZING LOCATION INFORMATION OF A MOBILE DEVICE

(71) Applicant: International Business Machines Corporation, Armonk, NY (US)

(72) Inventors: Saritha Arunkumar, Basingstoke (GB); Stephen D. Pipes, Hampshire (GB); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/669,020

(22) Filed: Mar. 26, 2015

(65) Prior Publication Data

US 2015/0350890 A1    Dec. 3, 2015

(30) Foreign Application Priority Data

May 30, 2014    (GB) .................................. 1409608.5

(51) Int. Cl.
| | | |
|---|---|---|
| *H04M 1/66* | (2006.01) | |
| *H04W 24/00* | (2009.01) | |
| *H04W 12/02* | (2009.01) | |
| *H04W 4/02* | (2009.01) | |

(52) U.S. Cl.
CPC ................ *H04W 12/02* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 8,401,867 B2 | 3/2013 | Lagadec et al. | |
| 8,402,117 B2 | 3/2013 | Zellner et al. | |
| 8,489,110 B2 | 7/2013 | Frank et al. | |
| 8,559,927 B2 | 10/2013 | Kim | |
| 8,639,221 B1 | 1/2014 | Zang et al. | |
| 8,655,389 B1 | 2/2014 | Jackson et al. | |
| 2001/0055975 A1* | 12/2001 | McDonnell | G01S 5/0018 455/456.6 |
| 2002/0004399 A1* | 1/2002 | McDonnell | H04W 4/02 455/456.6 |

(Continued)

FOREIGN PATENT DOCUMENTS

| | | |
|---|---|---|
| GB | 2526614 A | 12/2015 |
| WO | 2005117481 A1 | 12/2005 |

(Continued)

OTHER PUBLICATIONS

Application No. 1409608.5 (United Kingdom), entitled "Anonymizing Location Information of a Mobile Device," filed on May 30, 2014, 26 pages.

(Continued)

*Primary Examiner* — Erika A Washington

(74) *Attorney, Agent, or Firm* — David Zwick; Mark Vallone

(57) ABSTRACT

Anonymizing location information of a mobile device by an anonymization provider. The anonymization provider receives, from the mobile device, location information identifying the location of the mobile device and anonymity requirements. The anonymization provider determines whether the received location information satisfies the received anonymity requirements. Based on the received location information satisfying the received anonymity requirements, the anonymization provider generates an obfuscated location for the mobile device and sends the obfuscated location to the mobile device. Based on the received location information not satisfying the received anonymity requirements, the anonymization provider sends a request for new anonymity requirements to the mobile device.

20 Claims, 7 Drawing Sheets

(56) References Cited

U.S. PATENT DOCUMENTS

| | | | |
|---|---|---|---|
| 2005/0114694 A1 | | 5/2005 | Wager et al. |
| 2007/0264974 A1 | | 11/2007 | Frank et al. |
| 2010/0064373 A1 | | 3/2010 | Cai et al. |
| 2012/0034930 A1 | | 2/2012 | Zellner et al. |
| 2012/0276927 A1 | * | 11/2012 | Pitt ................. H04L 63/101 455/456.2 |
| 2012/0317205 A1 | | 12/2012 | Lahiani et al. |
| 2013/0254071 A1 | | 9/2013 | Oley |
| 2013/0346211 A1 | | 12/2013 | Zellner et al. |
| 2015/0067880 A1 | * | 3/2015 | Ward ................. G06F 21/6245 726/26 |
| 2015/0350891 A1 | | 12/2015 | Arunkumar et al. |

FOREIGN PATENT DOCUMENTS

| | | | |
|---|---|---|---|
| WO | | 2012170314 A2 | 12/2012 |
| WO | WO 2013178284 A1 | * 12/2013 | ............ H04W 12/02 |

OTHER PUBLICATIONS

Search Report (United Kingdom), Application No. 1409610.1 (United Kingdom), Dated Oct. 10, 2014.
Disclosed Anonymously, "Method and System for creating anonymity in Snapshot (Single-Query) Location-Based Services," IP.com No. 000230783, Sep. 12, 2013, pp. 1-5.
Mano et al., "Anonymizing User Location and Profile Information for Privacy-aware Mobile Services," Proceedings of the 2nd ACM SIGSPATIAL International Workshop on Location Based Social Networks (LBSN), Nov. 2, 2010, pp. 68-75.
Gedik et al., "Protecting Location Privacy with Personalized k-Anonymity: Architecture and Algorithms," IEEE Transactions On Mobile Computing, vol. 7, No. 1, Jan. 2008, pp. 1-18.
Samarati et al., "Protecting Privacy when Disclosing Information: k-Anonymity and Its Enforcement through Generalization and Suppression," IEEE Transactions on Knowledge and Data Engineering, 2001, pp. 1-19.
Sweeney, "k-Anonymity: A Model for Protecting Privacy," International Journal on Uncertainty, Fuzziness and Knowledge-based Systems, vol. 10, Issue 5, May 2002, pp. 1-14.
Gedik et al., "Location Privacy in Mobile Systems: A Personalized Anonymization Model," Proceedings of the 25th IEEE International Conference on Distributed Computing Systems (ICSCS), Jun. 10, 2005.
U.S. Pat. No. 8626728, dated Jan. 7, 2012, Kalavade.
Kalnis et al. "Preventing location-based identity inference in anonymous spatial queries." Knowledge and Data Engineering, IEEE Transactions on 19.12, 1719-1733, 2007.
Kido et al. "An anonymous communication technique using dummies for location-based services." Pervasive Services. ICPS'05. Proceedings. International Conference on. IEEE, Jul. 2005.
IBM: List of IBM Patents or Patent Applications Treated as Related (Appendix P), Jan. 4, 2016, pp. 1-2.

* cited by examiner

ANONYMIZING LOCATION INFORMATION OF A MOBILE DEVICE

STATEMENT REGARDING FEDERALLY SPONSORED RESEARCH OR DEVELOPMENT

This invention was made with Government support under contract number W911NF-06-3-0001 awarded by the Army Research Office (ARO). The Government has certain rights to this invention.

BACKGROUND

The present invention relates to anonymization of location information of a mobile device and more particularly to anonymization of location information of a mobile device using an anonymization provider supplying anonymization data to the mobile device.

In a mobile micro-cloud setting having multiple entities there are various concerns relating to trust and vulnerability. One of these concerns is the release of information about a mobile device user's location to service providers when using location based services. This may be undesirable and can be avoided by location obfuscation wherein an approximate location may be provided that is sufficiently accurate for the response from the service provider to be useful, but not sufficiently accurate that the precise location may be determined. A location obfuscation module may operate in of the following three layers in a mobile micro-cloud: (i) mobile device, (ii) edge and (iii) core. Each of these solutions has diverse implications on the overall performance of an application (for example, latency), on application quality and on security objectives. For instance, a mobile device based solution has incomplete information (on the location of other devices) and thus may either be over conservative (more obfuscation which leads to poor application quality) or too liberal (less obfuscation and thus fail to meet security requirements).

Prior art solutions, typically implemented in smart phones, take the location, identity and query when making a location based service query. By default service providers of location based query services use the location information and hence know where the user's mobile device is located. This is a major breach of privacy if the user does not want to share the location information. Additionally, the service providers may also misuse the information and pass it on to third party applications who further misuse the location information.

PCT patent application WO 2012/170314 A2 discloses that requesting users and applications may be interested in communicating with target users/applications based on the whereabouts of the target user/device without disclosing identities of the parties. For example, a user may want to know if a restaurant is crowded or whether it is worth going to an event. However, there is no way to send a message to "someone located at that location" without exposing the sender's identity or knowing the identity of the target person(s). This capability is provided by mediating messages between the users (requesting and target) via an anonymous messaging component (e.g., a service) that maintains anonymity of the users relative to one another. The anonymous messaging component does not publish user identities, since the component mediates between the sender (requester) and the receiver(s) (target(s))".

United States Patent Application 2012-0034930 A1 discloses an anonymous location wireless network service that tracks the location and identity of network users, such as networks complying with enhanced 911 standards. The service provides content providers with the location of network users without revealing their identities. The service includes a wireless network having a proxy server, a network communication link to a plurality of web sites, and a wireless communication link to a plurality of handheld devices. The proxy server blocks identity by reading the location and identity information of network devices, generating dummy identifications, relating the dummy identifications to the identity information, storing the relationships in a memory storage, and forwarding the location information and dummy identifications to the global computer network. Upon receiving return messages from the global computer network, the proxy server reads the dummy identifications, looks up the related identity information in the memory storage, and forwards the data to the appropriate network devices.

United States Patent Application 2007-0264974 A1 discloses a method of implementing privacy control of location information. Such a method comprises defining a geographic zone for which pseudo-location information is to be reported as the current location of the user, wherein the pseudo-location information is not the current location of the user; receiving the current location of the user; determining that the current location is in the geographic zone; and reporting the pseudo-location information as the current location of the user when the current location is determined to be in the geographic zone.

Gedik, B. and Liu, L., "Location privacy in mobile systems: A personalized anonymization model", Proceedings of the 25th International Conference on Distributed Computing Systems (ICSCS 2005), 2005 discloses a personalized k-anonymity model for protecting location privacy against various privacy threats through location information sharing. A unified privacy personalization framework is provided to support location k-anonymity for a wide range of users with context-sensitive personalized privacy requirements. This framework enables each mobile node to specify the minimum level of anonymity it desires as well as the maximum temporal and spatial resolutions it is willing to tolerate when requesting for k-anonymity preserving location-based services (LBSs). An efficient message perturbation engine is run by the location protection broker on a trusted server and performs location anonymization on mobile users' LBS request messages, such as identity removal and spatio-temporal cloaking of location information.

Pierangela Samarati and L. Sweeney, "k-anonymity: a model for protecting privacy", Proceedings of the IEEE Symposium on Research in Security and Privacy (S&P). May 1998, Oakland, Calif. discloses how k-anonymity can be provided by using generalization and suppression techniques. It introduces the concept of minimal generalization, which captures the property of the release process not to distort the data more than needed to achieve k-anonymity.

The k-anonymity solutions described above has a number of problems. Due to the limited number of profiles created it is possible to easily track down the actual requestor and further identify the location of the requestor. It would be desirable to have a mechanism that ensures the inclusion of minimum number of similar profiles. Another problem with k-anonymity solution is that the queries are too specific and hence it is possible for the location service providers to track down the identity of the actual service requestor.

SUMMARY

Embodiments of the present invention disclose a method, computer program product, and system for anonymizing location information of a mobile device. An anonymizing provider receives, from the mobile device, location information identifying the location of the mobile device and anonymity requirements. The anonymization provider determines whether the received location information satisfies the received anonymity requirements. Based on the received location information satisfying the received anonymity requirements, the anonymization provider generates an obfuscated location for the mobile device and sends the obfuscated location to the mobile device. Based on the received location information not satisfying the received anonymity requirements, the anonymization provider sends a request for new anonymity requirements to the mobile device.

In another aspect of the present invention, the received location information includes an obfuscation value indicating an extent of location obfuscation, whereby location boundaries within which a generated obfuscated location will reside are determined. Based on the received location information not satisfying the received anonymity requirements, the anonymization provider sends a request for a second obfuscation value indicating a second extent of location obfuscation to the mobile device.

In another aspect of the present invention, determining whether the received location information satisfies the received anonymity requirements further includes the anonymization provider selecting, an obfuscation value indicating an extent of location obfuscation and verifying that the anonymity requirements are satisfied within location boundaries determined by the selected obfuscation value.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
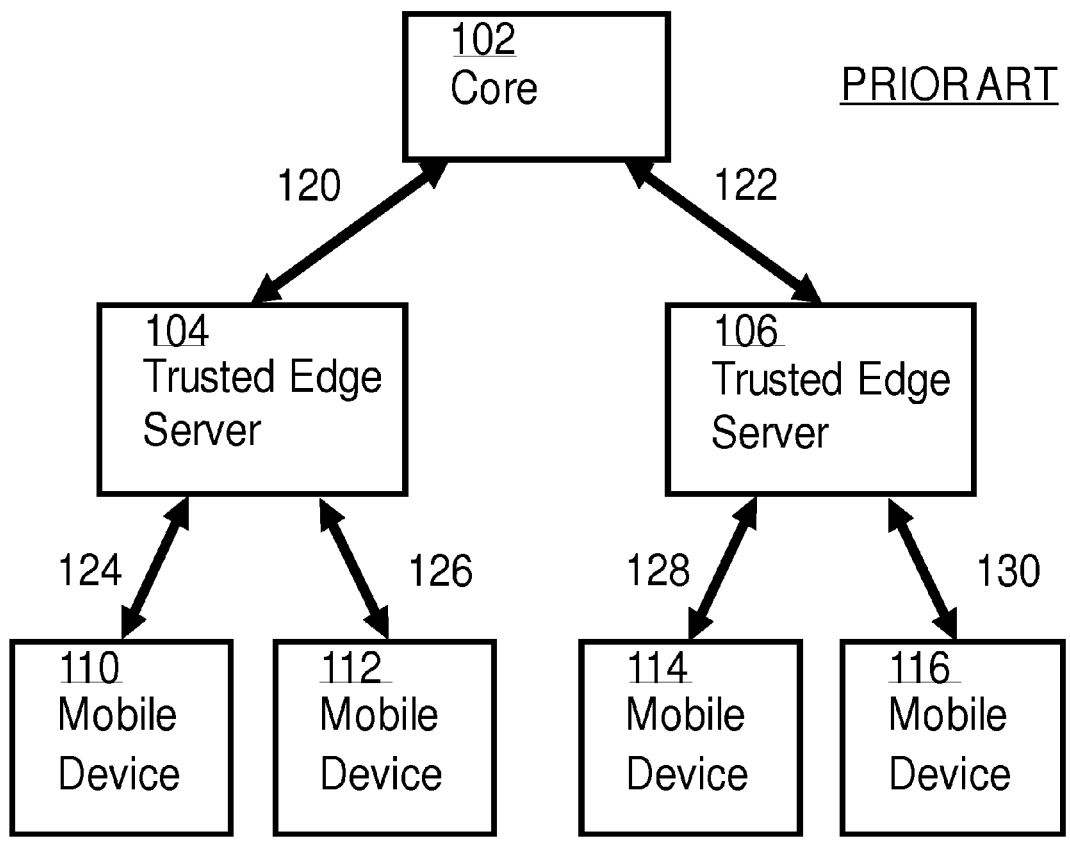
FIG. 1 shows a block diagram of a prior art mobile micro-cloud architecture.

FIG. 1 shows a prior art mobile micro-cloud architecture having a core 102 connected through network links 120, 122 to one or more trusted edge servers 104, 106 and through further network links 124, 126, 128, 130 to mobile devices 110, 112, 114, 116. Typically, the core 102 has access to large quantities of static information and the trusted edge servers 104, 106 have access to smaller quantities of more real-time and dynamic data. The trusted edge servers 104, 106 may be located at a WiFi access point or a cellular base station or the like. Although FIG. 1 shows two trusted edge servers 104, 106 and four mobile devices 110, 112, 114, 116, the number of each of these elements is purely exemplary and any number of these elements may be used in embodiments of the present invention. The network links 120, 122 and 124, 126, 128, 130 may be wired or wireless network links and may use any format which the elements at each end of the link may understand. Although not shown in FIG. 1, there may be additional network or other connections between each of the trusted edge servers 104, 106.

Figure 2:
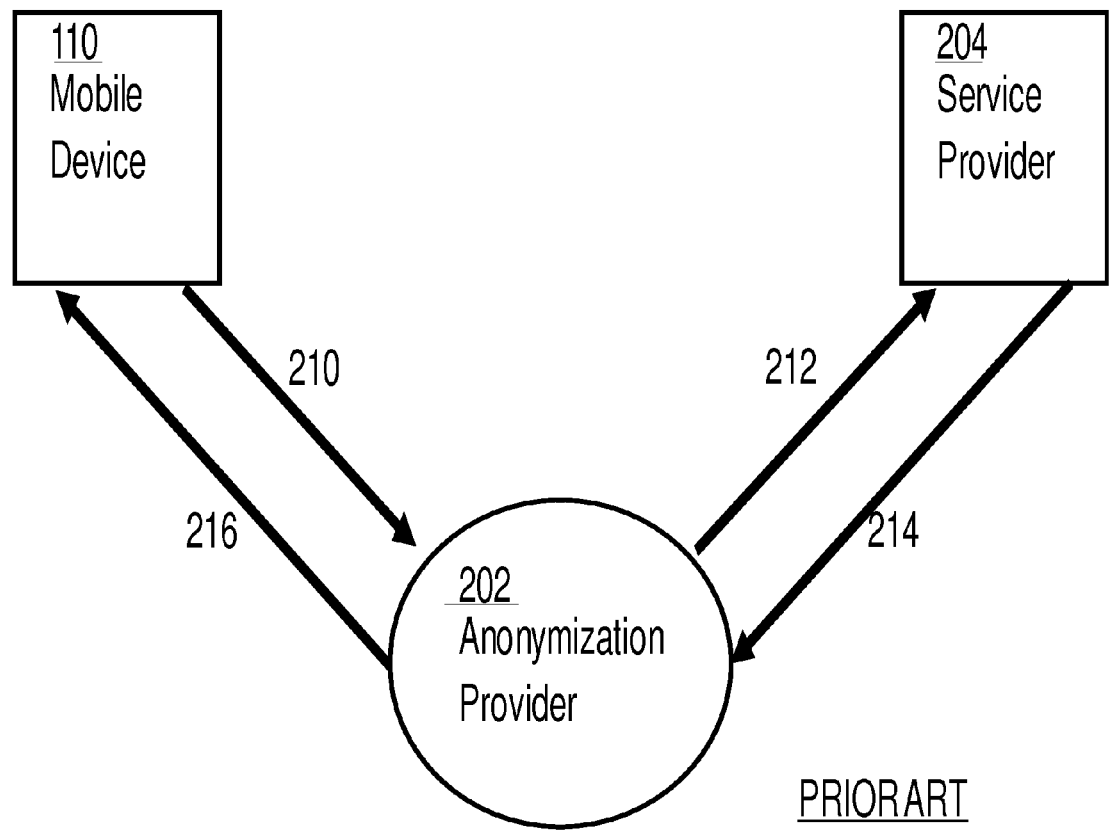
FIG. 2 shows a block diagram of a prior art anonymization session.

FIG. 2 shows a block diagram of a prior art anonymization session. The mobile device 110 sends 210 a request to the anonymization provider 202, which obfuscates the location data contained in the request prior to sending 212 it on to the service provider 204. The service provider's 204 response is returned 214 through the anonymization provider 202 which sends 216 the response to the mobile device 110. There are at least two problems with this prior art anonymization of location data. Firstly, the use of an anonymization provider 202 is revealed to the service provider 204. The service provider 204 may therefore infer that location data contained in the request has been modified by the anonymization provider 202. The ability of the service provider 204 to infer this may not be desired by the mobile device 110. Secondly, there is an additional risk that the anonymization provider 202 directs an attack on session data passing between the mobile device 110 and the service provider 204, such as a man-in-the-middle attack. The service provider 204 may be a regular web service located at the core 102 or at the trusted edge server 104, 106. The service provider 204 may be located at the mobile device 110 as an "app". The anonymization provider 202 may be located at the trusted edge server 104, 106.

Figure 3:
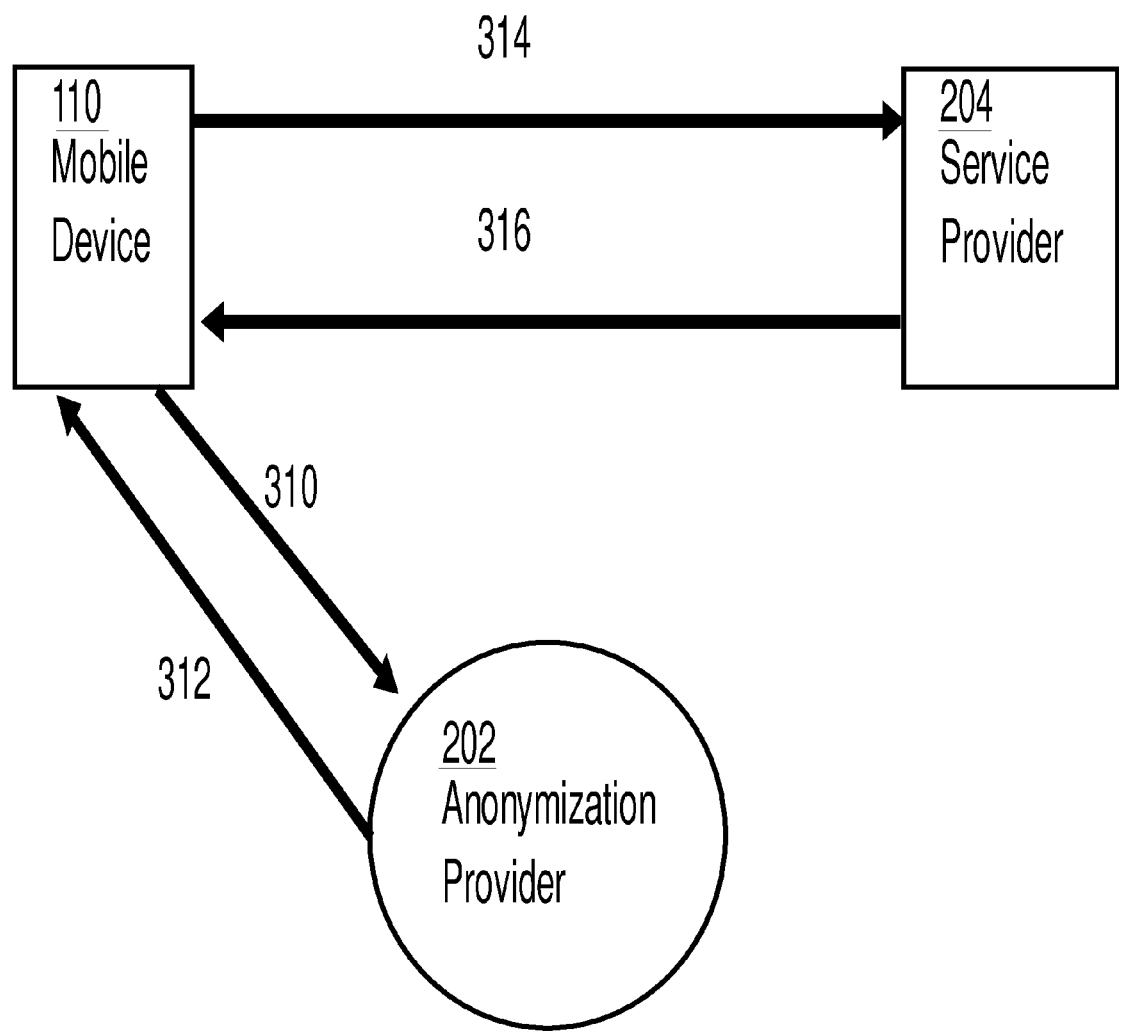
FIG. 3 shows a block diagram of an anonymization session according to embodiments of the present invention.

Embodiments of the present invention extend known solutions for anonymizing location data by introducing an additional interaction in the session protocol between the service consumer, for example, a mobile device 110 and the service provider 204, for example, a web service. FIG. 3 shows a block diagram of an anonymization session according to embodiments of the present invention. The anonymization session of FIG. 3 is designed to enforce the privacy requirements of service consumers, such as mobile device 110, thereby mitigating the first problem identified above. Additionally, the anonymization session of FIG. 3 helps to mitigate the more traditional information security threat in the second concern identified above.

Embodiments of the present invention add an additional interaction in the session protocol between the mobile device 110 and the service provider 204. The service provider 204 is now unaware of the presence of the anonymization provider 202 by virtue of the breaking of the link between them found in prior art anonymization approaches. In a successful session, the mobile device 110 requests 310 anonymization of location data from the anonymization provider 202 and receives 312 obfuscated location data from the anonymization provider 202. The mobile device 110 then forwards 314 the obfuscated location data to the service provider 204. The service provider 204 is unaware of the existence of the anonymization provider 202 in this system by simple analysis of the incoming request. The service provider 204 returns 316 the response back to the mobile device 110. With appropriate validation at the mobile device 110, the anonymization provider 202 cannot successfully mount an attack on the data, such as a man-in-the-middle attack because the data passes from the mobile device 110 to the service provider 204 without passing through the anonymization provider 202. The embodiment of FIG. 3 preserves the privacy of the location information but is still able to get the results for the query based on the location information. As with the prior art system of FIG. 2, the service provider 204 may be a regular web service located at the core 102 or at the trusted edge server 104, 106. The service provider 204 may also be located at the mobile device 110 as an "app". The anonymization provider 202 may be located at the trusted edge server 104, 106.

Two embodiments will now be described. Firstly, a mobile device 110 based embodiment will be described with reference to FIGS. 4 and 5. In the first embodiment, the function of the anonymization provider 202 is provided in part at the mobile device 110 and in part at the trusted edge server 104, 106. The service provider 204 may be provided at any of the mobile device 110, the trusted edge server 104, 106, or the core 102. If provided at the mobile device 110, the service provider 204 takes the form of an "app" on the mobile device 110. If provided at the trusted edge server 104, 106 or at the core 102, the service provider 204 takes the form of a regular web service.

Secondly, a trusted edge server 104, 106 based solution will be described with reference to FIGS. 6 and 7. In the second embodiment, the function of the anonymization provider 202 is provided at the trusted edge server 104, 106. The location of the service provider 204 takes the same form as the first embodiment.

Figure 4:
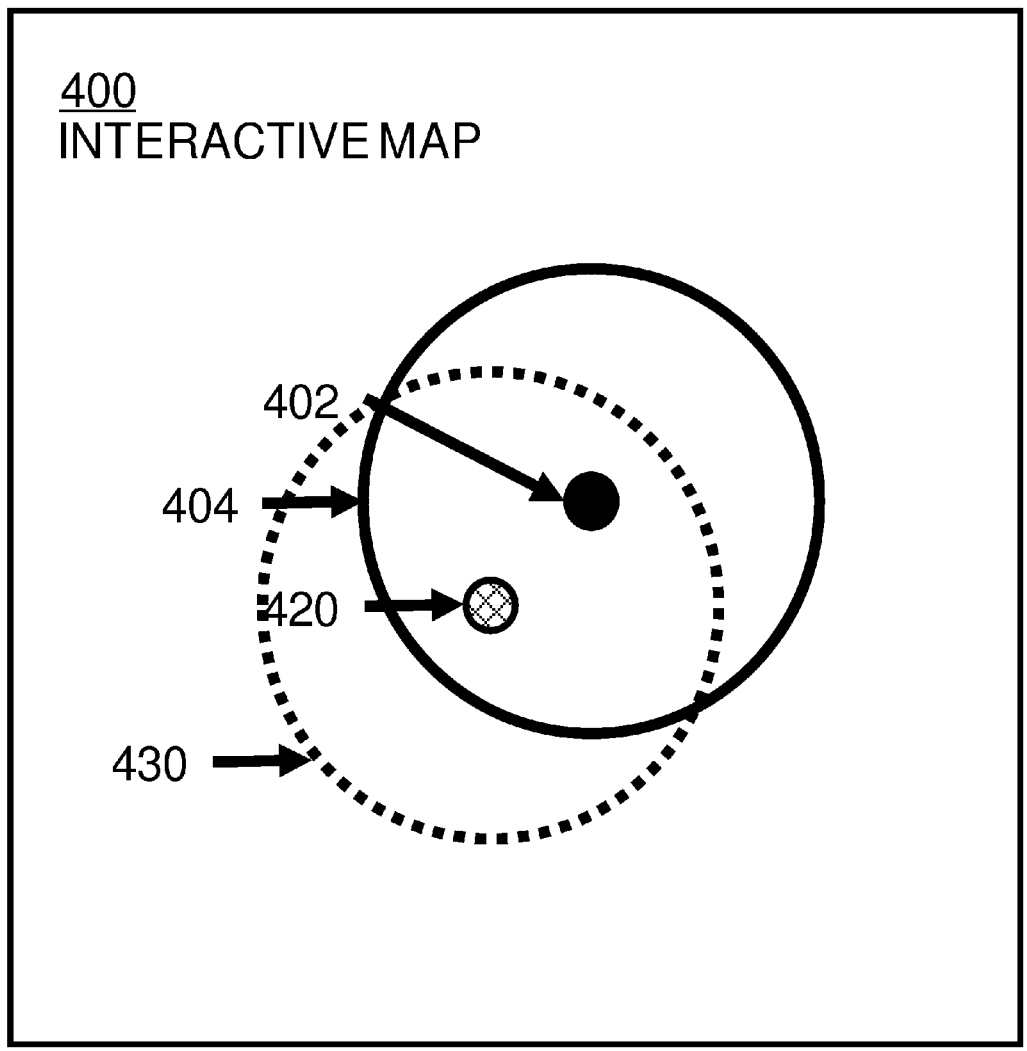
FIG. 4 shows an interactive map used in a first embodiment of the present invention.

FIG. 4 shows an interactive map 400 for use in a first embodiment of the present invention, this embodiment being mobile device 110 based. The interactive map 400 may also include any number of geographical and/or physical features displayed to a user and which are not shown in FIG. 4 for clarity. The location 402 at which a user has clicked is shown as is an area (described herein as the box 404) surrounding the user's location 402. Although the "box" 404 is shown as a circle in FIG. 4, it may be any shape such as a square, an ellipse, a rectangle or any other shape. The preferred embodiment of the "box" is a circle because it encloses the maximum area for a given maximum distance from the user's location 402. The location 420 and the dashed line circle 430 will be explained below with reference to 518 in FIG. 5.

Figure 5:
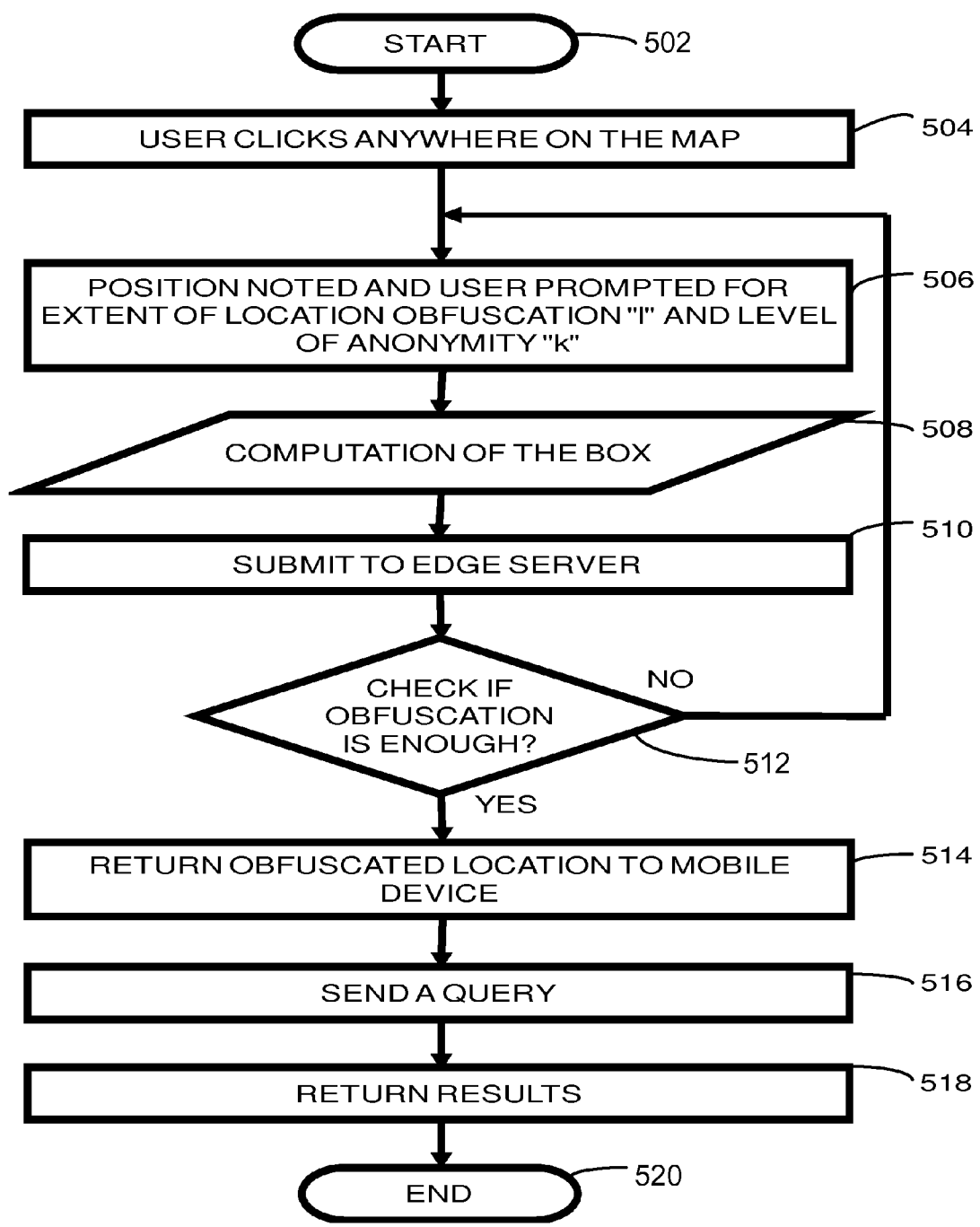
FIG. 5 is a flow chart illustrating a method for using an access token, in accordance with an embodiment of the present invention.

Referring to FIG. 5, a method according to an embodiment of the present invention starts at 502. At 504, a user clicks anywhere on the interactive map 400 displayed at the mobile device 110 to indicate the mobile device's 110 current location. In the example of FIG. 4, the user has clicked on the map at location 402. The current location 402 may be identified by latitude and longitude, by use of grid coordinates or any other way in which a current location 402 may be identified. The current location 402 may be selected by the user or may be directly input using a position location system, such as GPS or by use of identification of a current connection within a cellular wireless network. A user may, optionally, be asked to confirm a position supplied by a position location system.

At 506, the current location 402 of the mobile device 110 is noted by the mobile device 110 and the user is prompted for the desired extent of location obfuscation "1" and the level of anonymity "k".

The desired extent of location obfuscation "1" is expressed in terms of a distance, that is, for example, in metres, such as by supplying a bounding box (such as the circle 404 of FIG. 4) containing the point. The desired extent of location obfuscation "1" identifies the area within which the user would like their location to be provided to a service provider 204. The level of anonymity "k" means that the location information for the mobile device 110 sent to the service provider 204 is such that the location information cannot be distinguished from at least k−1 other mobile devices 110 who may also send location information to the service provider 204. For example, if a "k" value of 9 is used, then the location information supplied could be associated with at least 8 other mobile devices 112, 114, 116.

The mobile device 110 does not know where other mobile devices 112, 114, 116 are located and so cannot realize k-anonymity. The mobile device 110 "hopes" that the extent of location obfuscation "1" supplied (that is, the distance in metres) means that the level of anonymity "k" is enough. That is, that there are enough other mobile devices 112, 114, 116 within the desired distance "1" of the mobile device 110. If the extent of location obfuscation "1" for the bounding box is not sufficient, then as described below another iteration with a different value for the extent of location obfuscation "1" is carried out.

Once the values for location obfuscation "1" and level of anonymity "k" are entered by the user at the mobile device 110, then at 508, the computation of a box is performed at the mobile device 110. The box 404 is computed based on the values the user entered at 506 for "1" and "k". For example, a user may enter a latitude of 41.13 degrees North and 73.72 degrees West. The computed box 404 may be 41.08 degrees North and 73.79 degrees West to 41.18 degrees North and 73.65 degrees West. This box 404 is a square of dimensions approximately six miles by six miles, with the position of the mobile device 110 given by the user being located within the box 404. Embodiments of the present invention are not limited to a box 404 of this size as the box 404 size may be determined by the values provided by the user for "k" and "1". Additionally, embodiments of the present invention are not limited to the computation of the box 404 being in any particular position with respect to the mobile device 110, except that the mobile devices' 110 position should be located within the box 404. In a preferred embodiment, the mobile devices' 110 position is at the center of the box 404. Further, embodiments of the present invention are not limited to the computed "box" being circular. For example, the "box" may actually be square, rectangular or elliptical. A circular "box" has the advantage that a maximum area is enclosed for a given maximum distance from the center point of the box when compared to any other shape.

At 510, the details are submitted by the mobile device 110 to the trusted edge server 104, 106. In a preferred embodiment, this submission is through a HTTP post. The details may typically include the location, extent of location obfuscation "1" and level of anonymity "k". The trusted edge server 104, 106 may know the location of at least k−1 other mobile devices 112, 114, 116.

At 512, the trusted edge server 104, 106 checks whether the obfuscation is good enough. This check is done by checking if there are "k" other mobile devices 112, 114, 116 within the box 404 associated with the extent of location obfuscation "1", including the mobile device 110 requesting the anonymization. If there are "k" other mobile devices 112, 114, 116 within the box 404, then the obfuscation is good enough and processing proceeds at 514. If there are not "k" other mobile devices 112, 114, 116 within the box 404, then processing returns to 506, where the user is asked to enter a different value for "1" in order for a box 404 meeting the extent of location obfuscation "1" and level of anonymity "k" to be computed. The user is not asked to enter a new value for the level of anonymity "k".

Once the obfuscation is good enough, that is there are "k" other mobile devices 112, 114, 116 within the box 404, at 514 the obfuscated location 420 is returned by the trusted edge server 104, 106 to the mobile device 110 with an indication that the obfuscation is good enough.

At 516, the mobile device 110 can send a query to the service provider 204 including the anonymized obfuscated location 420. The anonymized obfuscated location 420 is typically a random point in the box 404. Sending more information, such as the co-ordinates of the box risks undermining the anonymization of the location data. The query may be to a location based service provided by the service provider 204 such as where the nearest coffee shop may be found.

At 518, the results are returned by the service provider 204 to the mobile device 110. Referring back to FIG. 4, the results may be the locations of the nearest coffee shops to the obfuscated location 420. The results may exclude some coffee shops that are closer to the user's real location, which is any location within the solid line circle 404 centered on the real location 402, but outside the dashed line circle 430 centered on the obfuscated location 420. The results may include other coffee shops that are further from the user's real location 402, which is any location within the dashed line circle 430 centered on the obfuscated location 420, but outside the solid line circle 404 centered on the user's real location 402. However, the results will likely include some coffee shops that are closer to the user's location 402, that is within both the solid line circle 404 centered on the real location 402 and the dashed line circle 430 centered on the obfuscated location 420. In the example of FIG. 4, the dashed line circle 430 is shown as being the same size as the extent of obfuscation "1", but in practice it is likely to be different and will likely be provided by the end user when making the request to the service provider. For example, the user may request from the anonymization provider 202 an extent of location obfuscation of 200 metres (the radius of the solid line circle 404 centered on the user's location 402), but desires to know from the service provider 204 of any coffee shops within 500 metres (the radius of the dashed line circle 430 centered on the obfuscated location 420). Returning to FIG. 5, the method according to an embodiment of the present invention ends at 520.

Figure 6:
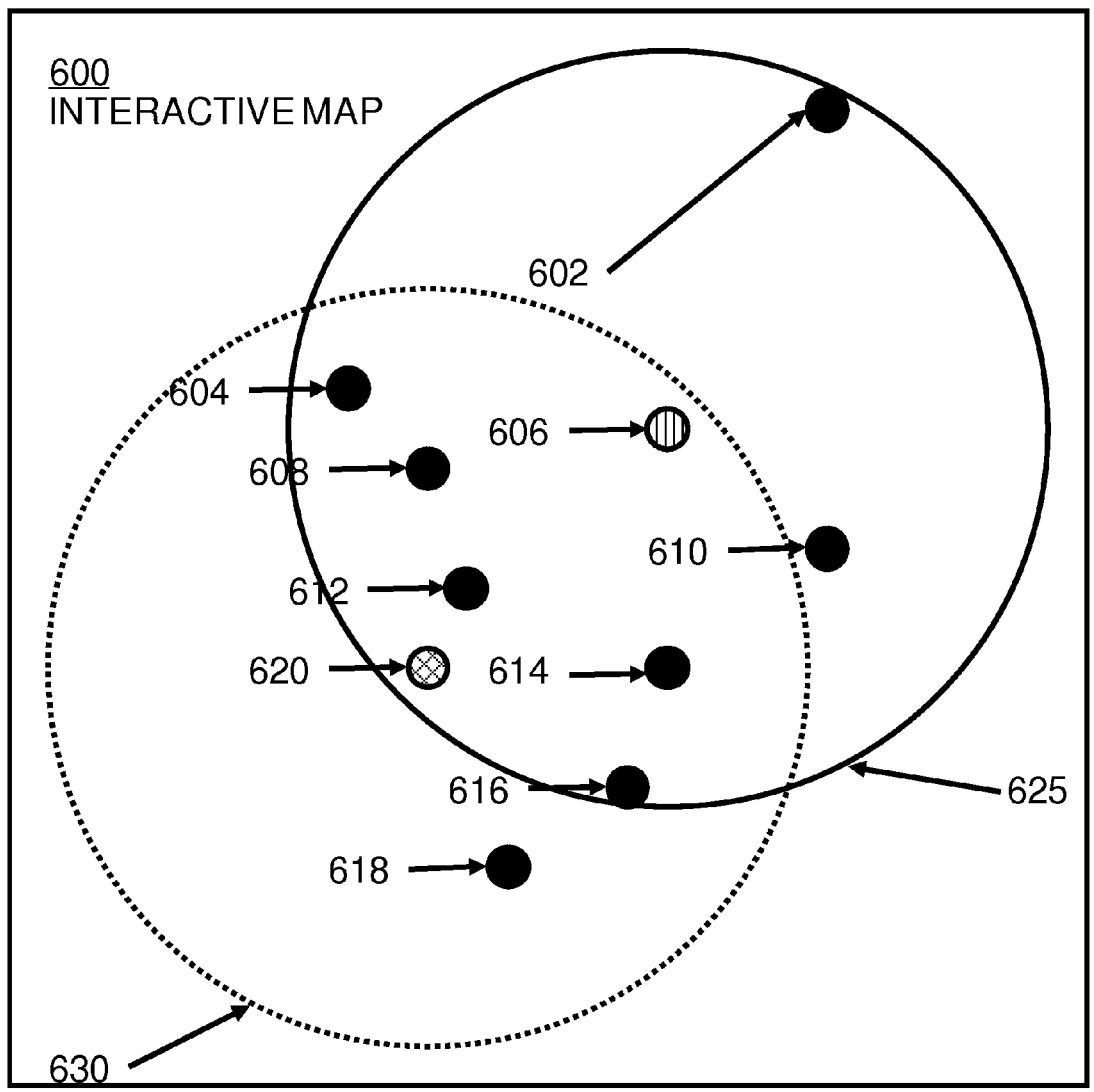
FIG. 6 shows an interactive map used in a second embodiment of the present invention.

FIG. 6 shows an interactive map 600 for use in a second embodiment of the present invention, this embodiment being trusted edge server 104, 106 based. The interactive map 600 may include any number of geographical and/or physical features displayed to a user which are not shown in FIG. 6 for clarity. Locations 602 to 618 show locations of mobile device 110, 112, 114, 116 users, comprising the location 606 of the mobile device 110 whose user desires anonymization of data and the locations 602, 604, 608-618 of other mobile device 112, 114, 116 users. One of the locations 606 is identified as the mobile device 110 of the user who desires anonymization of data, whilst the other locations 602, 604, 608-618 are other mobile device 112, 114, 116 users. Another of the locations 620 is identified in FIG. 6 as the obfuscated location to be returned to the mobile device 110 by the anonymization provider 202 for sending as the obfuscated location with the query to the service provider 204. Typically, the scale of the map will be chosen such that there are about "k" different mobile devices 112, 114, 116 shown. "k" corresponds to the level of anonymity desired by the user of the mobile device 110. The solid line circle 625 and the dashed line circle 630 will be explained below with reference to 718 in FIG. 7.

Figure 7:
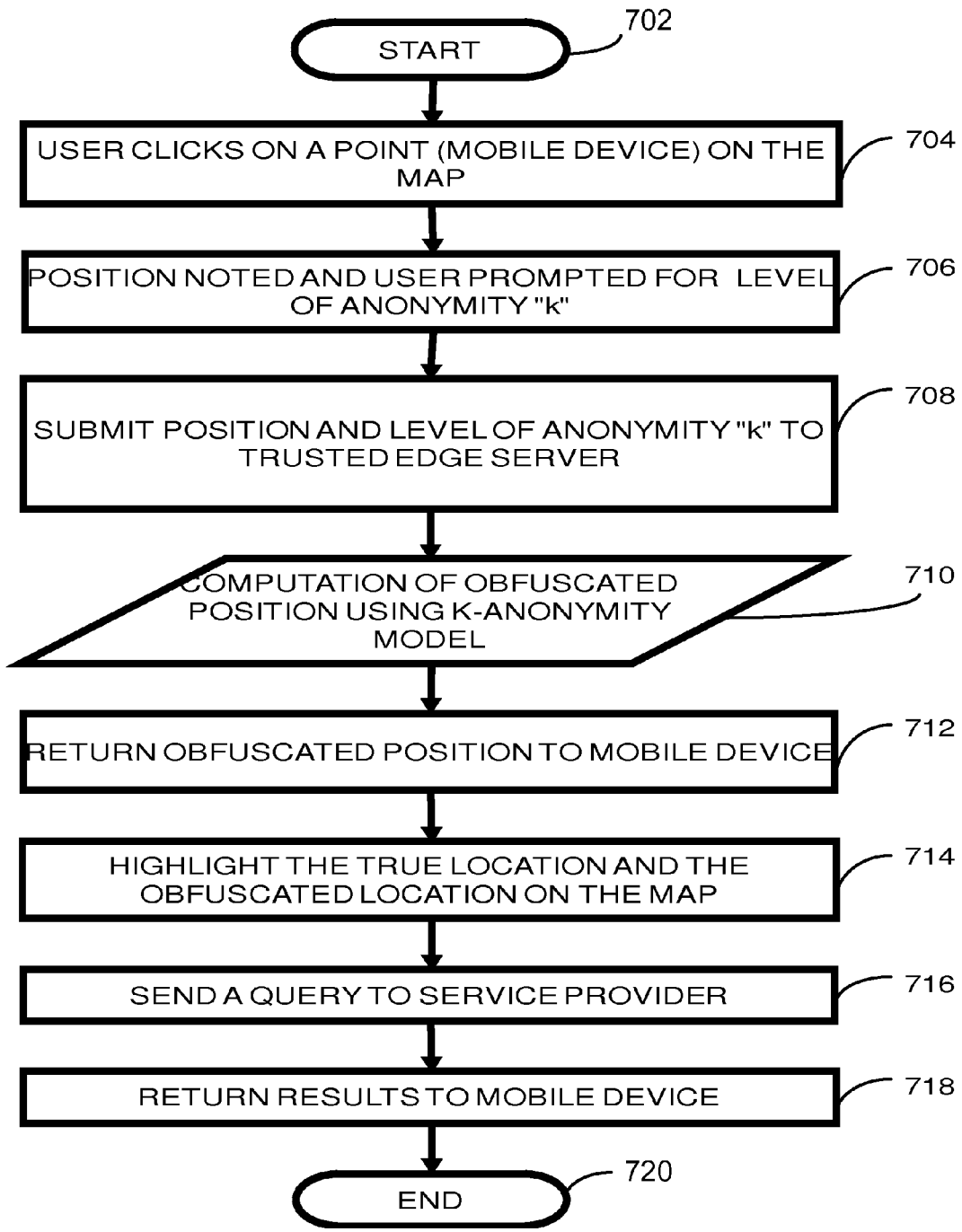
FIG. 7 shows a flow chart of a method of location anonymization according to a second trusted edge server based embodiment of the present invention.

Referring to FIG. 7, a method according to an embodiment of the present invention starts at 702. At 704, a user clicks on the interactive map 600 displayed at the mobile device 110 to indicate the position of the user. As explained above with reference to FIG. 5, the mobile device 110 user's current location 606 may be selected by the user or may be directly input using a position location system, such as GPS or by use of identification of a current connection within a cellular wireless network. A user may, optionally, be asked to confirm a position supplied by a position location system. In the example of FIG. 6, the user has clicked on the map at location 606. The locations 602, 604 and 608-618 of the other mobile devices 112, 114, 116 do not appear on the map displayed to the user, but are known only to the trusted edge server 104, 106. The desired location 606 may be identified by latitude and longitude, by use of grid coordinates or any other way in which a current location 606 may be identified. At 706, on clicking on the location of the user's mobile device 110, the mobile device's 110 location will be noted at the mobile device 110. Also at 706, the user is prompted at the mobile device 110 for the desired level of anonymity "k". In a preferred embodiment, a value for the desired extent of location obfuscation "1" is not requested and is not sent. In an alternative embodiment, a value for the desired extent of location obfuscation "1" is also optionally requested from a user and may be sent with the value for the level of desired anonymity "k". The sending of a value for the desired extent of location obfuscation "1" allows a user to indicate that they desire the obfuscated location 620 to fall within the distance "1" of the user's actual location 606. At 708, the details are submitted by the mobile device 110 to the trusted edge server 104, 106. In a preferred embodiment, this submission is through a HTTP post. The details may typically include the location and level of anonymity "k". Typically, the details do not include the extent of location obfuscation "1", although this may optionally be included. The trusted edge server 104, 106 knows the location of at least "k"-1 other mobile devices 112, 114, 116.

At 710, the obfuscated location 620 will be computed using the k-anonymity model. In a typical application, it is desirable that the trusted edge server 104, 106 selects a minimum extent of location obfuscation "1" that will satisfy the level of anonymity "k". However, for some applications, it is desirable to specify a maximum extent of location obfuscation "1" because the utility of the application executing on the mobile device 110 drops sharply beyond that extent. For example, if the location is being provided in order to identify the nearest coffee shop, then whilst a minimum extent of location obfuscation "1" is needed for anonymity, there is a maximum extent of location obfuscation "1" for the response to the query to be useful. An extent of location obfuscation "1" of 50 kilometres will not be very helpful if it means that the response to the query returns a coffee shop that is 49 kilometres away, when there are many other coffee shops that are closer to the mobile device's 110 real location 606.

At 712, the obfuscated location 620 is returned by the trusted edge server 104, 106 to the mobile device 110. At 714, once the obfuscated position is received, it is highlighted on the interactive map 600 at the mobile device 110 by showing the true location 606 and the received anonymized location 620. The locations 602, 604 and 608-618 of the other mobile devices 112, 114, 116 do not appear on the map displayed to the user, but are known only to the trusted edge server 104, 106.

At 716, the mobile device 110 sends a query to the service provider 204 including the anonymized location 620. The query may be to a location based service such as where the nearest coffee shop may be found.

At 718, the results of the query are returned from the service provider 204 to the mobile device 110. The results may be the locations of the nearest coffee shops to the obfuscated location 620. The results may exclude some coffee shops that are closer to the user's real location, which is any location within the solid line circle 625 centered on the real location 606, but outside the dashed line circle 630 centered on the obfuscated location 620. The results may include other coffee shops that are further from the user's real location 606, which is any location within the dashed line circle 630 centered on the obfuscated location 620, but outside the solid line circle 625 centered on the user's real location 606. However, the results will likely include some coffee shops that are closer to the user's location 606, that is within both the solid line circle 625 centered on the real location 606 and the dashed line circle 630 centered on the obfuscated location 620. In the example of FIG. 6, the dashed line circle 630 is shown as being the same size as the extent of obfuscation "1", but in practice it is likely to be different and will likely be provided by the end user when making the request to the service provider. For example, the user may request from the anonymization provider 202 an extent of location obfuscation of 200 metres (the radius of the solid line circle 625 centered on the user's location 606), but desires to know from the service provider 204 of any coffee shops within 500 metres (the radius of the dashed line circle 630 centered on the obfuscated location 620). The method according to an embodiment of the present invention ends at 720.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or trusted edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for anonymizing location information of a mobile device, the method comprising:
   receiving, by an anonymization provider, from the mobile device, location information identifying the location of the mobile device;
   receiving, by the anonymization provider, from the mobile device, anonymity requirements;
   determining, by the anonymization provider, whether the received location information satisfies the received anonymity requirements; and
   based on the received location information satisfying the received anonymity requirements:
      generating, by the anonymization provider, an obfuscated location for the mobile device; and
      sending, by the anonymization provider, to the mobile device, the obfuscated location; and
   based on the received location information not satisfying the received anonymity requirements, sending, by the anonymization provider, to the mobile device, a request for new anonymity requirements.

2. The method according to claim 1, wherein the received location information includes an obfuscation value indicating an extent of location obfuscation, whereby location boundaries within which a generated obfuscated location will reside are determined.

3. The method according to claim 2, wherein based on the received location information not satisfying the received anonymity requirements further comprises:
   sending, by the anonymization provider, to the mobile device, a request for a second obfuscation value indicating a second extent of location obfuscation.

4. The method according to claim 2, wherein determining, by the anonymization provider, whether the received location information satisfies the received anonymity requirements further comprises:
   verifying, by the anonymization provider, that the anonymity requirements are satisfied within the location boundaries determined by the obfuscation value received with the location information.

5. The method according to claim 1, wherein the received anonymity requirements include a k-anonymity value specifying how many other mobile devices cannot be distinguished from the mobile device.

6. The method according to claim 1, wherein determining, by the anonymization provider, whether the received location information satisfies the received anonymity requirements further comprises:
   selecting, by the anonymization provider, an obfuscation value indicating an extent of location obfuscation; and
   verifying, by the anonymization provider, that the anonymity requirements are satisfied within location boundaries determined by the selected obfuscation value.

7. The method according to claim 6, further comprising:
   sending, by the anonymization provider, to the mobile device, the selected obfuscation value.

8. A computer program product for anonymizing location information of a mobile device, the computer program product comprising one or more computer readable storage medium and program instructions stored on at least one of the one or more computer readable storage medium, the program instructions comprising:
   program instructions to receive, by an anonymization provider, from the mobile device, location information identifying the location of the mobile device;
   program instructions to receive, by the anonymization provider, from the mobile device, anonymity requirements;
   program instructions to determine, by the anonymization provider, whether the received location information satisfies the received anonymity requirements; and
   based on the received location information satisfying the received anonymity requirements:
      program instructions to generate, by the anonymization provider, an obfuscated location for the mobile device; and
      program instructions to send, by the anonymization provider, to the mobile device, the obfuscated location; and
   based on the received location information not satisfying the received anonymity requirements, program instructions to send, by the anonymization provider, to the mobile device, a request for new anonymity requirements.

9. The computer program product according to claim 8, wherein the received location information includes an obfuscation value indicating an extent of location obfuscation, whereby location boundaries within which a generated obfuscated location will reside are determined.

10. The computer program product according to claim 9, wherein based on the received location information not satisfying the received anonymity requirements further comprises:
    program instructions to send, by the anonymization provider, to the mobile device, a request for a second obfuscation value indicating a second extent of location obfuscation.

11. The computer program product according to claim 9, wherein program instructions to determine, by the anonymization provider, whether the received location information satisfies the received anonymity requirements further comprises:
    program instructions to verify, by the anonymization provider, that the anonymity requirements are satisfied within the location boundaries determined by the obfuscation value received with the location information.

12. The computer program product according to claim 8, wherein the received anonymity requirements include a k-anonymity value specifying how many other mobile devices cannot be distinguished from the mobile device.

13. The computer program product according to claim 8, wherein program instructions to determine, by the anonymization provider, whether the received location information satisfies the received anonymity requirements further comprises:
    program instructions to select, by the anonymization provider, an obfuscation value indicating an extent of location obfuscation; and program instructions to verify, by the anonymization provider, that the anonymity requirements are satisfied within location boundaries determined by the selected obfuscation value.

14. The computer program product according to claim 13, further comprising:
program instructions to send, by the anonymization provider, to the mobile device, the selected obfuscation value.

15. A computer system for anonymizing location information of a mobile device, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:
program instructions to receive, by an anonymization provider, from the mobile device, location information identifying the location of the mobile device;
program instructions to receive, by the anonymization provider, from the mobile device, anonymity requirements;
program instructions to determine, by the anonymization provider, whether the received location information satisfies the received anonymity requirements; and
based on the received location information satisfying the received anonymity requirements:
program instructions to generate, by the anonymization provider, an obfuscated location for the mobile device; and
program instructions to send, by the anonymization provider, to the mobile device, the obfuscated location; and
based on the received location information not satisfying the received anonymity requirements, program instructions to send, by the anonymization provider, to the mobile device, a request for new anonymity requirements.

16. The computer system according to claim 15, wherein the received location information includes an obfuscation value indicating an extent of location obfuscation, whereby location boundaries within which a generated obfuscated location will reside are determined.

17. The computer system according to claim 16, wherein program instructions to determine, by the anonymization provider, whether the received location information satisfies the received anonymity requirements further comprises:
program instructions to verify, by the anonymization provider, that the anonymity requirements are satisfied within the location boundaries determined by the obfuscation value received with the location information.

18. The computer system according to claim 15, wherein the received anonymity requirements include a k-anonymity value specifying how many other mobile devices cannot be distinguished from the mobile device.

19. The computer system according to claim 15, wherein program instructions to determine, by the anonymization provider, whether the received location information satisfies the received anonymity requirements further comprises:
program instructions to select, by the anonymization provider, an obfuscation value indicating an extent of location obfuscation; and
program instructions to verify, by the anonymization provider, that the anonymity requirements are satisfied within location boundaries determined by the selected obfuscation value.

20. The computer system according to claim 19, further comprising:
program instructions to send, by the anonymization provider, to the mobile device, the selected obfuscation value.

\* \* \* \* \*